(12) United States Patent
Yamauchi et al.

(10) Patent No.: US 6,295,310 B1
(45) Date of Patent: Sep. 25, 2001

(54) MOBILE COMMUNICATION SYSTEM

(75) Inventors: Takahisa Yamauchi; Akihiro Shibuya, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/090,215

(22) Filed: Jun. 4, 1998

(30) Foreign Application Priority Data

Jun. 12, 1997 (JP) ............................................ 9-155033

(51) Int. Cl.[7] ............................. H04B 15/00; H04K 1/00; H04L 27/30
(52) U.S. Cl. ............................................. 375/133; 455/452
(58) Field of Search ...................................... 375/132, 133, 375/134, 135, 136, 137; 455/447, 450, 452; 370/329

(56) References Cited

U.S. PATENT DOCUMENTS 5,737,359 * 4/1998 Koivu .................................. 375/202
5,774,808 * 6/1998 Sarkioja et al. ...................... 455/436

FOREIGN PATENT DOCUMENTS

A5-110499    4/1993  (JP) .
A6-334630   12/1994  (JP) .

* cited by examiner

*Primary Examiner*—Chi Pham
*Assistant Examiner*—Phuong Phu

(57) ABSTRACT

A mobile communication system which comprises a base station and a mobile station that communicates therewith while performing frequency hopping based on a predetermined hopping sequence. Based on the received power of a signal received from the base station at a first frequency in the hopping sequence, the mobile station switches the first frequency to a second one next thereto in the hopping sequence and keeps on communicating with the base station at the second frequency.

47 Claims, 10 Drawing Sheets

| HOPPING SEQUENCE | HOPPING FREQUENCY |
|---|---|
| C1 | f1 → f2 → f3 |
| C2 | f2 → f3 → f1 |
| C3 | f3 → f1 → f2 |
| C4 | f1 → f3 → f2 |
| C5 | f2 → f1 → f3 |
| C6 | f3 → f2 → f1 |

MOBILE COMMUNICATION SYSTEM

BACKGROUND OF THE INVENTION

This application claims priority under 35 U.S.C. §§119 and/or 365 to Hei 9-155033 filed in Japan on Jun. 12, 1997, the entire contents of which are herein incorporated by reference.

1. Field of the Invention

The present invention relates to a mobile communication system that involves periodic switching of the transmitted frequencies by a frequency hopping technique.

2. Description of the Prior Art

A conventional mobile communication system will be described first with reference to FIG. 12 which depicts a conventional system in conceptual form.

Reference numeral 10 denotes a mobile station, and 11 a base station. Data is transmitted and received between the base station 11 and the mobile station 10. Reference numeral 12 denotes a radio cell, which indicates the coverage area surrounding the base station 11 and within which data is exchanged between the base and mobile stations 11 and 10.

A septuplet of radio cells 12 constitute one area as indicated by hatching in FIG. 12. The frequencies that are assigned to each of such areas repeat in a cyclic order; that is, the areas are common in the frequencies assigned thereto. Each area made up of seven radio cells will hereinafter be referred to as a repetition area. Further, the number of radio cells forming the repetition area will hereinafter be referred to as a repetition cell number. In the prior art example of FIG. 12, the repetition cell number is seven.

Furthermore, the radio cells forming the repetition area are each assigned a plurality of frequencies, which will hereinafter be referred to as a frequency group. And the radio cells making up the repetition area are each assigned seven different frequency groups.

The base station 11 has control over the mobile stations 10 belonging to its radio cell and allocates to each mobile station 10 a hopping sequence for frequency hopping use.

Next, a description will be given of the operation of the conventional mobile communication system conceptually depicted in FIG. 12.

In FIG. 12 the base station 11 specifies predetermined hopping sequences for all the mobile stations 10 placed under its control. Based on the hopping sequence specified by the base station 11, each mobile station 10 performs frequency hopping.

Now, a description will be given, with reference to FIG. 13, of hopping sequences c1, c2, c3, c4, c5 and c6 that are specified for a cell A or B when it is assigned frequencies f1, f2 and f3. Let it be assumed that mobile stations M1 to m3 are present in the cell A and mobile stations M4 to m6 in the cell B.

Suppose that the mobile station M1 is assigned the hopping sequence c1, the mobile station m2 the hopping sequence c2, the mobile station m3 the hopping sequence c3, the mobile station M4 the hopping sequence c4, the mobile station m5 the hopping sequence c5 and the mobile station m6 the hopping sequence c6. The mobile stations M1 to m6 perform frequency hopping with fixed hopping periods based on the hopping sequences c1 to c6 respectively assigned to them. The frequencies f1, f2 and f3 will hereinafter be called first, second and third frequencies in this order.

Turning next to FIG. 14, a description will be made of how frequency hopping takes place, for example, in the mobile stations M1 to m3 in the cell A. The abscissa represents time.

The mobile station M1 uses the frequencies f1, f2 and f3 when it outputs bursts B1, B2 and B3, respectively. The mobile station m2 uses the frequencies f2, f3 and f1 when it outputs bursts B1, B2 and B3, respectively. The mobile station m3 uses the frequencies f3, f1 and f2 when it outputs bursts B1, B2 and B3, respectively.

The bursts B1 to B3 mentioned herein are pulse-like waves or waveforms created by dividing original data such as speech and adding a header or the like to each divided piece of data. By virtue of the hopping sequences c1 to c3 assigned thereto, respectively, the mobile stations M1 to m3 in the cell A will not be assigned the same frequency at the same timing. Likewise, the mobile stations M4 to m6 in the cell B will not be assigned the same frequency at the same timing.

FIG. 15 depicts in block form the mobile station 10 that forms the conventional mobile communication system. With reference to FIG. 15, the configuration of the conventional mobile station 10 will be described.

In FIG. 15, reference numeral 20 denotes an antenna. Reference numeral 21 denotes a transmitting part, which is connected via a switch 22 to the antenna 20. Reference numeral 23 denotes a receiving part, which is also connected via the switch 22 to the antenna 20. Reference numeral 24 denotes a transmission/received data processing part, which is connected to the transmitting part 21 and the receiving part 23. Reference numeral 25 denotes a synthesizer part, which is connected to the transmitting part 21, the receiving part 23 and the transmission/received data processing part 24. Reference numeral 26 denotes a control part, which is connected to the transmission/received data processing part 24 and the synthesizer part 25.

Reference numeral 24$i$ denotes transmission data, which is input into the transmission/received data processing part 24. Reference numeral 24$t$ denotes transmission burst data, which is provided from the transmission/received data processing part 24 to the transmitting part 21. Reference numeral 21$t$ denotes a transmission signal, which is output from the transmitting part 21. Reference numeral 23$r$ denotes a received signal, which is input into the receiving part 23. Reference numeral 24$r$ denotes received burst data, which is provided from the receiving part 23 to the transmission/received data processing part 24.

Reference numeral 24$o$ denotes received data, which is output from the transmission/received data processing part 24. Reference numeral 25$t$ denotes transmission frequency data, which is provided from the synthesizer part 25 to the transmitting part 21. Reference numeral 25$r$ denotes receive frequency data, which is provided from the synthesizer part 25 to the receiving part 23. Reference numeral 26$r$ denotes hopping sequence data, which is provided from the transmission/received data processing part 24 to the control part 26. The transmission/received data processing part 24 instructs the control part 26 to perform frequency hopping based on the hopping sequence data 26$r$.

Reference numeral 26$t$ denotes first switching data, which is provided from the control part 26 and fed into the synthesizer part 25. The synthesizer part 25 operates on the first switching data 26$t$, performing frequency hopping. Reference numeral 24$g$ denotes a timing signal, which is provided from the transmission/received data processing part 24 and fed into the synthesizer part 25. The timing signal 24$g$ is output from the transmission/received data processing part 24 based on the received burst data 24$r$.

Next, the operation of the conventional mobile station 10 will be described below.

The mobile station 10 receives signals sent from the base station 11 by the antenna 20. The received signal 23r is applied from the antenna 20 to the receiving part 23 via the switch 22. When supplied with the received signal 23r, the receiving part 23 demodulates it and outputs the received burst data 24r, which is fed into the transmission/received data processing part 24.

The transmission/received data processing part 24 decodes the received burst data and outputs the received data 24o. Further, the transmission/received data processing part 24 extracts the hopping sequence data 26r from the received burst data 24r. The transmission/received data processing part 24 applies the timing signal 24g to the synthesizer 25. Additionally, the transmission/received data processing part 24 is supplied with the transmission data 24i and generates therefrom the transmission burst data 24t, which is fed into the transmitting part 21. The hopping sequence data 26r output from the transmission/received data processing part 24 is input into the control part 26.

Based on the hopping sequence data 26r input thereinto, the control part 26 determines the frequency desired to hop. And the control part 26 uses the first switching data 26t to indicate the thus determined hopping frequency to the synthesizer part 25. The synthesizer part 25 further receives the timing signal 24g from the transmission/received data processing part 24, and determines the frequency to hop and its timing.

Based on the first switching data 26t fed thereinto, the synthesizer part 25 provides the transmission frequency data 25t or received frequency data 25r to the transmitting part 21 or receiving part 23 so that the frequency to be used by the mobile communication system equipped with the synthesizer part 25 is switched, for example, from a first to a second frequency.

When the synthesizer part 25 indicates a predetermined frequency to the transmitting part 21, the former provides the transmission frequency data 25t to the latter. When the synthesizer part 25 indicates a predetermined frequency to the receiving part 23, the former provides the received frequency data 25t to the latter. The transmission burst data 24t provided from the transmission/received data processing part 24 is input into the transmitting part 21. Supplied with the transmission burst data 24t, the transmitting part 21 modulates it based on the transmission frequency data 25t and outputs the transmission signal 21t. The transmission signal 21t provided from the transmitting part 21 is sent to the base station 11 via the switch 22 and the antenna 20.

With the conventional mobile communication system described above, frequency hopping is performed in a predetermined cycle regardless of the receiving conditions of the mobile station. Hence, a poor receiving level may sometimes be switched to a high receiving level, but the cyclic or periodic frequency hopping gives rise to a problem that a high receiving level may be switched to a low level. Another problem of the prior art is that no particular attention is paid to interferences.

SUMMARY OF THE INVENTION

It is therefore a primary object of the present invention to provide a mobile communication system which, when the mobile station and the base station communicate with each other, performs frequency hopping based on the receiving level of the mobile or base station, thereby permitting enhancement of speech quality.

A secondary object of the present invention is to provide a mobile communication system which performs frequency hopping only at frequencies of high receiving level, ensuring excellent speech quality.

To attain the above objective, according to a first aspect of the present invention, there is provided a mobile communication system which comprises a base station and a mobile station that communicates therewith while performing frequency hopping based on a predetermined hoping sequence and in which, based on the received power of a signal received from the base station at a first frequency in the hopping sequence, the mobile station switches the first frequency to a second frequency next to the first frequency in the hopping sequence and continues to communicate with the base station at the second frequency. This system configuration permits high-quality, high-reliability communications between the base and the mobile station.

According to a second aspect of the present invention, there is provided a mobile communication system in which, when the received power signal received by a mobile station from a base station at a first frequency in a hopping sequence is above a predetermined power level, the mobile station communicates with the base station at the first frequency, whereas when the received power is below the predetermined power level the mobile station switches from the first frequency to a second frequency next to the first frequency in the hopping sequence and continues to communicate with the base station at the second frequency. Thus, when the power level of the mobile station is low, frequency hopping is carried out so that the frequency for use in the mobile station is switched to facilitate communications with the base station at a higher power level. When the received power level of the mobile station is already high, no frequency hopping takes place, and hence the frequency being used in the mobile station remains unswitched so as to continue communications with the base station at the higher power level. This also provides high-quality, high-reliability communications between the base and the mobile station.

According to a third aspect of the present invention, there is provided a mobile communication system which comprises a base station and a mobile station that communicates therewith while performing frequency hopping based on a predetermined hopping sequence and in which the mobile station outputs information based on the received power of a signal received from the base station at a first frequency in the hopping sequence and, based on the information received from the mobile station, the base station switches from the first frequency to a second frequency next to the first frequency in the hopping sequence and continues to communicate with the mobile station at the second frequency this system configuration also permits high-quality, high-reliability communications between the base and the mobile station.

According to a fourth aspect of the present invention, there is provided a mobile communication system which comprises a mobile station and a base station that communicates therewith while performing a frequency hopping based on a predetermined hopping sequence, the base station switches from the first frequency to a second frequency next to the first frequency in the hopping sequence and continues to communicate with the mobile station at the second frequency. This system configuration also permits high-quality, high-reliability communications between the base and the mobile station.

According to a fifth aspect of the present invention, there is provided a mobile communication system which, when the received power of a signal received by a base station from a mobile station at a first frequency in a hopping sequence is above a predetermined power level, the base station communicates with the mobile station at the first frequency, whereas when the received power is below the predetermined power level the base station switches from the first frequency to a second frequency next to the first frequency in the hopping sequence and continues to communicate with the mobile station at the second frequency. Thus, when the received power level of the mobile station is low, frequency hopping is carried out so that the frequency for use in the mobile station is switched to facilitate communications at a higher power level. When the received power level of the mobile station is already high, no frequency hopping takes place, and hence the frequency being used in the mobile station remains unswitched so as to continue communications with the base station at the high power level. This system configuration also provides high-quality, high-reliability communications between the base and the mobile station.

According to a sixth aspect of the present invention, there is provided a mobile communication system which comprises a mobile station and a base station that communicates therewith while performing frequency hopping based on a predetermined hopping sequence and in which the base station outputs information based on the received power of a signal received from the mobile station at a first frequency in the hopping sequence and, based on the information received from the base station, the mobile station switches from the first frequency to a second frequency next to the first frequency in the hopping sequence and continues to communicate with the base station at the second frequency. This system configuration also permits high-quality, high-reliability communications between the base and the mobile station.

According to a seventh aspect of the present invention, there is provided a mobile communication system which, based on the received power of an interference received together with a received signal from the mobile station at a first frequency, switches from the first frequency to a second frequency next to the first frequency in the hopping sequence and thereafter establishes communications between a base and a mobile station at the second frequency. This system configuration also provides high-quality, high-reliability communications between the base and mobile station.

According to an eighth aspect of the present invention, there is provided a mobile communication system in which, when the received power of an interference received together with a received signal of a first frequency in a hopping sequence is below a predetermined power level, a base and a mobile station communicate with each other at the first frequency, whereas when the received power of the interference is above the predetermined power level the first frequency is switched to a second frequency next to the first frequency in the hopping sequence for subsequent communications between the base and the mobile station. Thus, when the mobile station is low in the received power level for the desired received signal but high for the interference, frequency hopping is carried out so that the frequency for use in the mobile station is switched to raise the received power level of the desired received signal and reduce that of the interference. When the received power level of the desired signal is already high and that of the interference is low, no frequency hopping takes place, and hence the frequency being used in the mobile station remains unswitched so as to hold the power level high for the desired received signal and the power level low for the interference. This system configuration also provides high-quality, high-reliability communications between the base and the mobile station.

According to a ninth aspect of the present invention, there is provided a mobile communication system which comprises a base station and a mobile station that communications therewith while performing frequency hopping based on a predetermined hopping sequence and in which, based on the received power of an interference received together with a received signal from the base station at a first frequency in the hopping sequence, the mobile station switches from the first frequency to a second frequency next to the first frequency in the hopping sequence thereafter establishes communications with the base station at the second frequency. This system configuration also permits high-quality, high-reliability communications between the base and the mobile station.

According to a tenth aspect of the present invention, there is provided a mobile communication system in which, when the received power of an interference received together with a received signal from a base station at a first frequency in a hopping sequence is below a predetermined power level, a mobile station communicates with the base station at the first frequency, whereas when the received power of the interference wave above the predetermined power level the mobile station switches from the first frequency to a second next to the first frequency in the hopping sequence and thereafter establishes communications with the base station at the second frequency. Thus, when the mobile station receives the interference at a high power level, frequency hopping is carried our so that the frequency for use in the mobile station is switched to reduce the received power level of the interference. When the received power level of the mobile station is already low, no frequency hopping takes place, and hence the frequency being used in the mobile station remains unswitched so as to continue communications with the base station while retaining the received power level low for the interference. This system configuration also provides high-quality, high-reliability communications between the base and the mobile station.

According to an eleventh aspect of the present invention, there is provided a mobile communication system which comprises a base station and a mobile station that communicates therewith while performing frequency hopping based on a predetermined hopping sequence and in which the mobile station outputs information based on the received power of an interference received together with a received signal from the base station at a first frequency in the hopping sequence and, based on the information received from the mobile station, the base station switches from the first frequency to a second frequency next to the first frequency in the hopping sequence and continues to communicate with the mobile station at the second frequency. This system configuration also permits high-quality, high-reliability communications between the base and the mobile station.

According to a twelfth aspect of the present invention, there is provided a mobile communication system which comprises a mobile station and a base station that communicates therewith while performing frequency hopping based on a predetermined hopping sequence and in which, based on the received poser of an interference received together with a received signal from the mobile station at a first frequency in the hopping sequence, the base station switches from the first frequency to a second frequency next to the first frequency in the hopping sequence and continues to communicate with the mobile station at the second frequency. This system configuration also permits high-quality, high-reliability communications between the base and the mobile station.

According to a thirteenth aspect of the present invention, there is provided a mobile communication system which, when the received power of an interference received together with a received signal from a mobile station at a first frequency in a hopping sequence is below a predetermined power level, a base station communicates with the mobile station at the first frequency, whereas when the received power of the interference is above the predetermined power level the based station switches from the first frequency to a second next to the first frequency in the hopping sequence and thereafter establishes communications with the mobile station at the second frequency. Thus, when the base station receives the interference at a high power level, frequency hopping is carried out so that the frequency for use in the base station is switched to reduce the received power level of the interference. When the received power level is already low, no frequency hopping takes place, and hence the frequency being used in the base station remains unswitched so as to continue communications with the mobile station while retaining the received power level low for the interference. This system configuration also provides high-quality, high-reliability communications between the base and the mobile station.

According to a fourteenth aspect of the present invention, thee is provided a mobile communication system which comprises a mobile station and a base station that communicates therewith while performing frequency hopping based on a predetermined hopping sequence and in which the base station outputs information based on the received power of an interference received together with a received signal from the mobile station at a first frequency in the hopping sequence and based on the information received from the base station, the mobile station switches from the first frequency to a second next to the first frequency in the hopping sequence and continues to communicate with the base station at the second frequency. This system configuration also provides high-quality, high-reliability communications between the base and the mobile station.

According to a fifteenth aspect of the present invention, there is provided a mobile communication system in which a mobile or base station selects those of a plurality of frequencies in a hopping sequence at which received signals of the selected frequencies will satisfy predetermined requirements of received power, and forms a hopping sequence unique to the mobile or base station accordingly. With this mobile communication system, it is possible to perform frequency hopping based on the unique hopping sequence in which frequencies, at which the received power level is high, are arranged in a sequential order according to the hysteresis of the mobile or base station in the past-this permits relatively stable communications between the base and the mobile station.

According to a sixteenth aspect of the present invention, there is provided a mobile communication system in which a mobile or base station detects the received power of a received signal at every frequency in a hopping sequence for each cycle during which the mobile or base station performs frequency hopping to all the frequencies in the hopping sequence, then records in a recording part the frequency at which the received power was at a maximum, and creates an original hopping sequence based on plural frequencies recorded in the recording part. With this mobile communication system, it is possible to perform frequency hopping based on the unique hopping sequence in which frequencies, at which the received power level is high, are arranged in a sequential order according to the hysteresis of the mobile or base station in the past. This also permits relatively stable communications between the base and the mobile station.

According to a seventeenth aspect of the present invention, there is provided a mobile communication system in which a mobile or base station removes from its own unique hopping sequence that one of a plurality of frequencies at which a received signal will not satisfy predetermined requirements of received power. With this mobile communication system, that one of the frequencies in the hopping sequence which does not satisfy the predetermined requirements is replaced with a frequency that meets the requirements. This also permits relatively stable communications between the base and the mobile station.

According to an eighteenth aspect of the present invention, there is provided a mobile communication system which comprises a base station, a first mobile station that communicates therewith while performing frequency hopping based on a first hopping sequence, and a second mobile station that communicates with the base station while performing frequency hopping based on a second hopping sequence and in which, when the first mobile station which communicates with the base station at a first frequency in the first hopping sequence, continues to communicate with the base station at the first frequency based on the received power of a signal received from the base station at the first frequency, the second mobile station communicates with the base station while performing frequency hopping based on the second hopping sequence composed of a plurality of frequencies except the first frequency. With this mobile communication system, it is possible to suppress interference between a plurality of mobile stations and hence ensure high-quality, high-reliability communications.

According to a nineteenth aspect of the present invention, there is provided a mobile communication system in which, when a first mobile station communicates with a base station at a first frequency in a first hopping sequence and the received power of a received signal at the first frequency from the base station is above a predetermined power level, the first mobile station continues to communicate with the base station at the first frequency. This mobile communication system permits high-quality, high-reliability communications.

According to a twentieth aspect of the present invention, there is provided a mobile communication system in which a first mobile station communicates with a base station at a first frequency in a first hopping sequence and when the received power of a received signal at the first frequency from the base station is above a predetermined power level, the first mobile station continues to communicate with the base station at the first frequency, and in which a second mobile station communicates with the base station at a second frequency in a second hopping sequence and when the received power of a received signal at the second frequency from the base station is below a predetermined power level, the second mobile station communicates with the base station while performing frequency hopping based on the second hopping sequence composed of a plurality of frequencies except the first frequency. With this mobile communication system, it is possible to suppress interference between a plurality of mobile stations and hence ensure high-quality, high-reliability communications.

BRIEF DESCRIPTION OF THE DRAWINGS

Other objects, features and advantages of the present invention will become more apparent from the following description taken in conjunction with the accompanying drawings, in which.

DETAILED DESCRIPTION OF THE PREFERRED EMBODIMENTS

A detailed description will hereinafter be given, with reference to the accompanying drawings, of the preferred embodiments according to the present invention.

Embodiment 1

Figure 1:
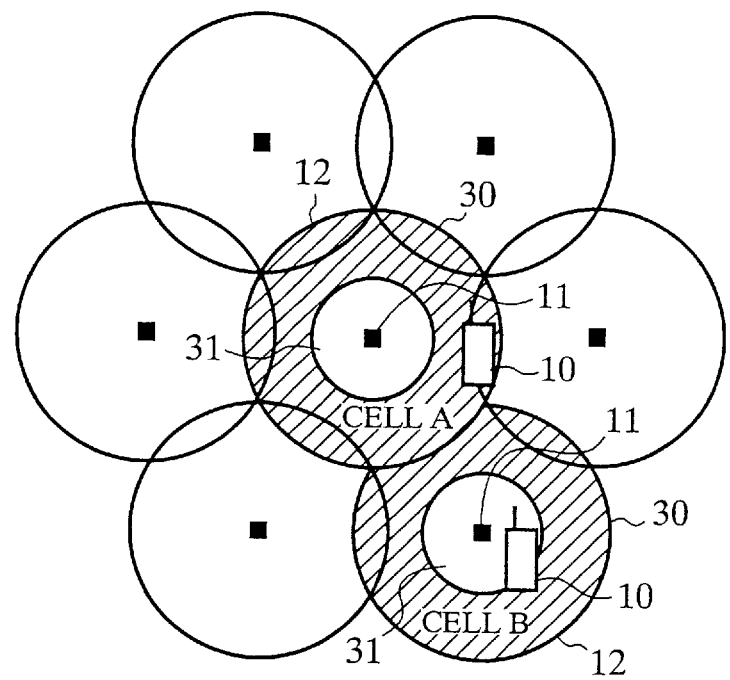
FIG. 1 is a diagram conceptually showing a first embodiment of the present invention.
Figures 12, 13:
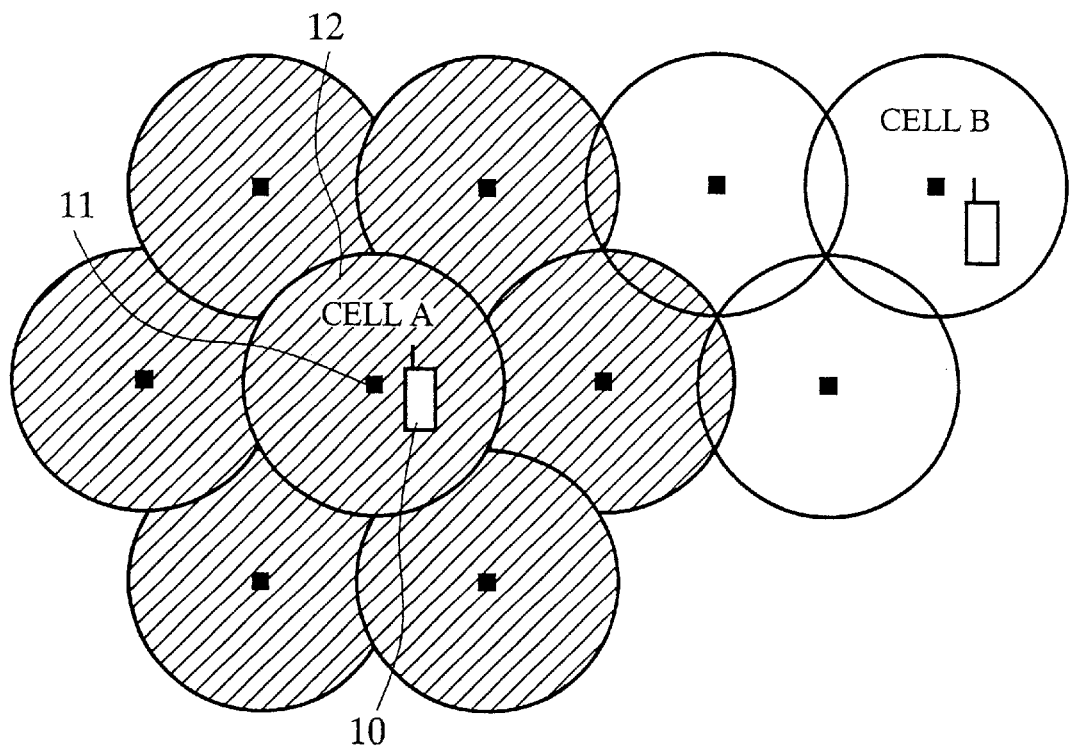
FIG. 12 is a conceptual diagram for explaining a conventional mobile communication system.
FIG. 13 is a diagram for explaining a conventional hopping sequence.
Figure 14:
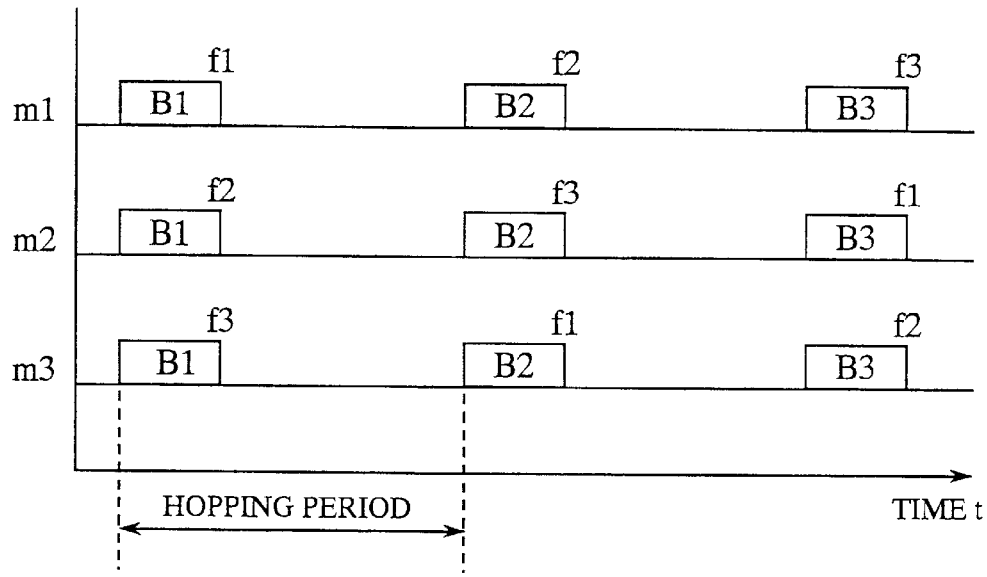
FIG. 14 is a timing chart of conventional frequency hopping.

Referring first to FIG. 1, a first embodiment (Embodiment 1) of the mobile communication system according to the present invention will be described. FIG. 1 conceptually illustrates the mobile communication system according to Embodiment 1 of the present invention. Reference numeral 30 denotes a first coverage area, and 31 a second coverage area. Each radio cell 12 is composed of the first and second coverage areas 30 and 31. In the drawings concerning mobile stations of the embodiments described later, the parts identical with or corresponding to those in the mobile station of the prior art example depicted in FIG. 12 will be identified by the same reference numerals and no description will be given thereof only parts different from those in FIG. 12 will be described.

Next, the operation of the mobile communication system depicted in FIG. 1 will be described below.

In FIG. 1 there is depicted an arrangement of the radio cells 12. Each of the cells 12 indicates the coverage area defined about the corresponding base station 11 with which the mobile station 10 exchanges data.

In FIG. 1, when the mobile station 10 is in the second coverage area 31 where the receiving level is high (in the case of the cell B), no frequency hopping is performed between the mobile station 10 and the base station 11. When the mobile station 10 is in the first coverage area 30 where the receiving level is low (in the case of the cell A), frequency hopping is performed between the mobile station 10 and the base station 11. That is, in the mobile communication system according to Embodiment 1, it is determined, based on the receiving level of a signal received by the mobile station 10 or the base station 11 at a certain frequency, whether or not the mobile station 10 performs frequency hopping with respect to the base station 10. The receiving level herein mentioned is the power level concerning the received power of the received signal.

Figure 2:
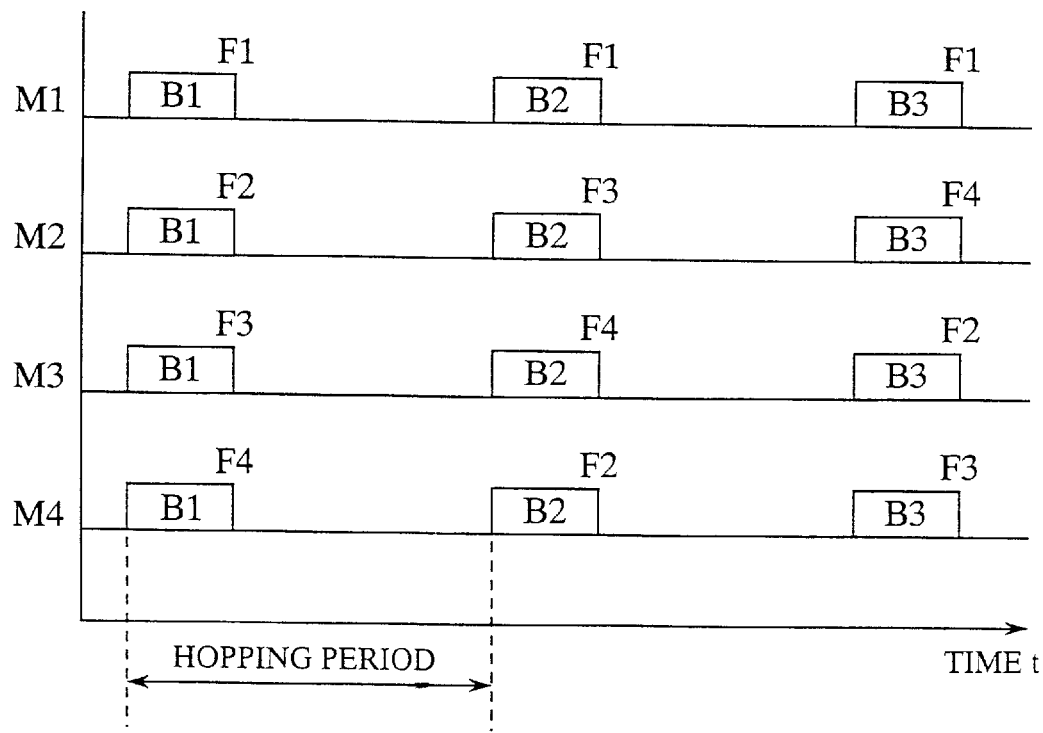
FIG. 2 is a timing chart of frequency hopping according to the first embodiment of the invention.

Turning next to FIG. 2, firstly seven hopping sequences z1 to z7 that are provided for the cell A will be described, for example, in the case where cell A is assigned frequencies F1, F2, F3 and F4. Let it be assumed that first through fourth mobile stations M1 to M4 are present in the cell A. The abscissa represents time.

Suppose that the mobile stations M1, M2, M3 and M4 are assigned the hopping sequences z1, z2, z3 and z4, respectively.

Furthermore assume that data of a burst B1 output from each of the mobile stations M1 to M4 is received by the base station 11, or that data output from the base station 11 is received by each of the mobile stations M1 to M4 at the timing of the burst B1. For example, when the receiving level is high between the mobile station M1 and the base station 10 and hence the transmission quality is high, the mobile station M1 still uses the frequency F1 at the timing of the next burst B2. The receiving level concerning a frequency signal between the mobile station M1 and the base station 11 is observed in the mobile station 11 or the base station 10. When the frequency hopping in the mobile station M1 is interrupted, the mobile station M1 will be located in the second coverage area 31 close to the base station 11.

On the other hand, when the frequency signal receiving level is not so high, for example, between the mobile station M2 and the base station 11 and hence the transmission quality is low, the frequency that the mobile station M1 uses in the hopping period concerning the next burst B2 is switched to the frequency F2. Further with respect to mobile stations M3 and M4, when the transmission quality is low, the mobile station M3 is switched from the frequency F3 to F4 and the mobile station M4 from the frequency F4 to F2. In the case where the transmission quality is high with respect to the mobile station M1 and no frequency hopping is performed therein, the base station 11 assigns the mobile stations M2 to M4 the new hopping sequences z5 to z7 that do not contain the frequency F1 to be used by the mobile station M1, and causes them to perform frequency hopping.

Let it be assumed that the mobile station M2 is assigned the hopping sequence z5, the mobile station M3 the hoping sequence z6 and the mobile station M4 the hopping sequence z7. The mobile stations M2 to M4 perform frequency hopping based on the hopping sequences z5 to z7 assigned to them, respectively, unless the receiving level in the mobile station M1 falls short of the predetermined level. When performing the frequency hopping, the mobile station M2 to M4 are present in the first coverage area 30 remote from the base station 11.

The hopping sequences z1 to z7 are prepared so that the same frequency will not be used in the mobile stations M1 to M4 at the same time. The received level of a signal transmitted between the mobile stations M1 to M4 and the base station 11 is strongly affected by geographical features. On account of this, the first and second coverage areas 30 and 31, which are defined by the received level of a signal do not always become concentric as depicted in FIG. 1.

When the received level of a signal transmitted between the mobile stations M1 to M4 and the base station 11 is very high, the transmission power of a signal that is output from each of the mobile stations M1 to M4 and the base station 11 may be reduced to such an extent as not to involve frequency hopping.

Figure 3:
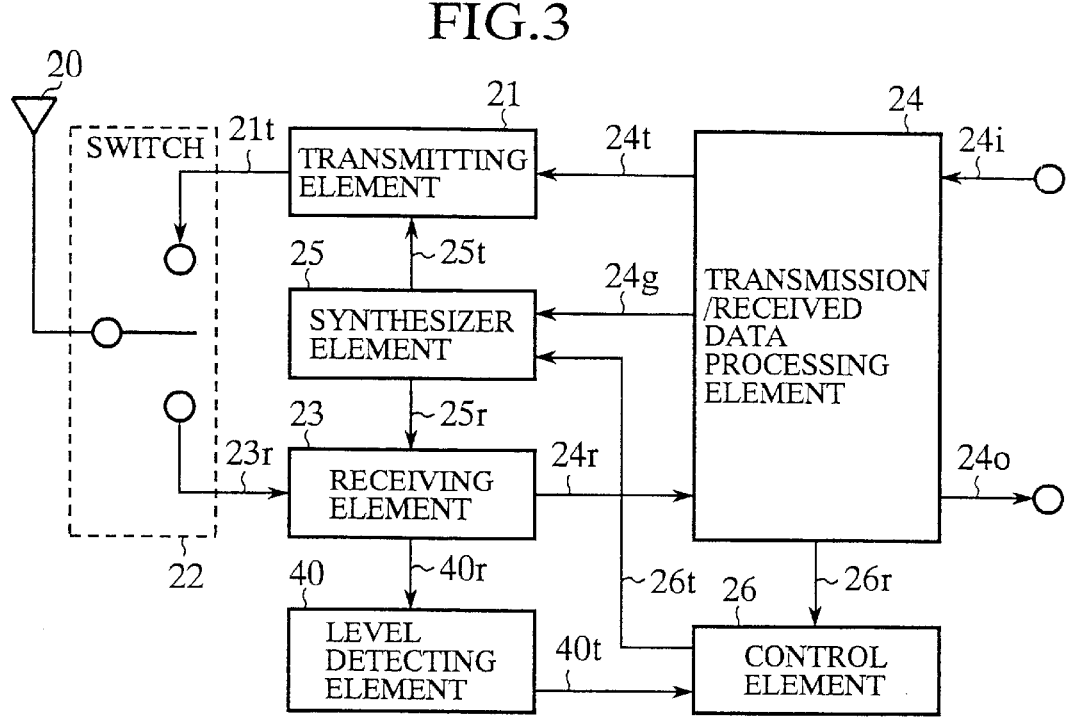
FIG. 3 is a block diagram illustrating a mobile station according to the first embodiment of the invention.
Figure 15:
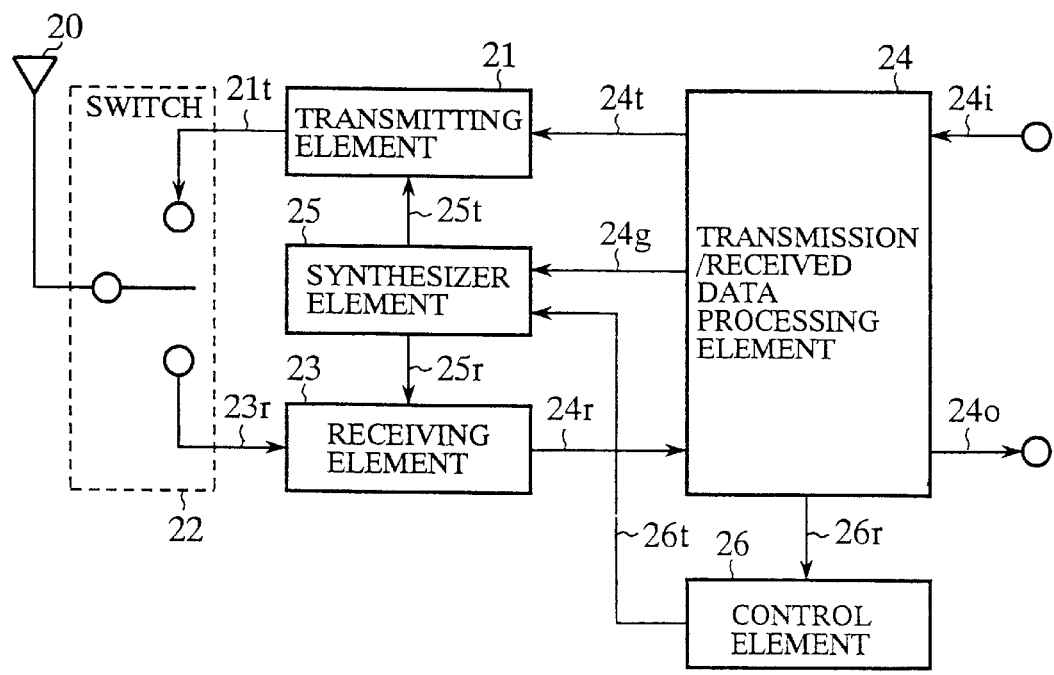
FIG. 15 is a block diagram depicting a conventional mobile station.

Referring now to FIG. 3, the construction of the mobile station 10 forming the mobile communication system according to Embodiment 1 will be described. FIG. 3 illustrates in block form the mobile station 10. In FIG. 3 the constituents identical with those in the conventional mobile station 10 depicted in FIG. 15 are identified by the same reference numerals and no description will be given of them.

In FIG. 3, reference numeral 40 denotes a level detecting part, which is connected to the receiving part 23 and the control part 26. Reference numeral 40r denotes level information about a received signal of a frequency received from the base station 11, which information is provided from the receiving part 23 to the level detecting part 40. Reference numeral 40t denotes level detected data, which is provided from the level detecting part 40 to the control part 26. The level detecting part 40 detects the received level of the received signal based on the level information 40r input thereinto. And the level detecting part 40 outputs the level detected data 40t based on the detected received level.

Next, a description will be given of the operation of the mobile station 10 that forms the mobile communication system depicted in FIG. 3. The level information 40r is input into the level detecting part 40 via the antenna 20, the switch 22 and the receiving part 23. Based on the level information 40r input thereinto, the level detecting part 40 detects the received level of the signal received by the mobile station 10 or the base station 11. Then, the level detecting part 40 supplies the control part 26 with the level detected data 40t based on the input level information 40r.

Based on the level detected data 40t input thereinto, the control part 26 makes a check to see if the detected level exceeds a predetermined threshold value. When the detected level is above the predetermined threshold value, no frequency hopping will take place between the mobile station 10 and the base station 11. When the detected level is below the predetermined threshold value, frequency hopping is performed between the mobile station 10 and the base station 11. In the latter case, the synthesizer part 25 switches, for example, the first frequency to the second one, depending on the first switching data 26t that is provided from the control part 26.

The timing for the frequency switching by the synthesizer part 25 is determined by the timing signal 24g that is provided from the transmission/receive data processing part 24. The first switching data 26t that is provided from the control part 26 is determined based on the hopping sequence data 26r also available from the transmission/receive data processing part 24. Further, it is considered that the frequency hopping is carried out when the received level of the received signal is below the predetermined threshold value as well as when the former does not exceed the latter. While in Embodiment 1 the mobile station performs the frequency switching after detecting the received level, the base station may also perform the detection of the received level and the frequency switching in this order. It is also possible that the mobile station detects the received level and indicates the detection result to the base station, causing it to perform the frequency switching. Alternatively, the base station may detect the received level first and then indicate the detection result to the mobile station, causing it to perform the frequency switching.

Figure 4:
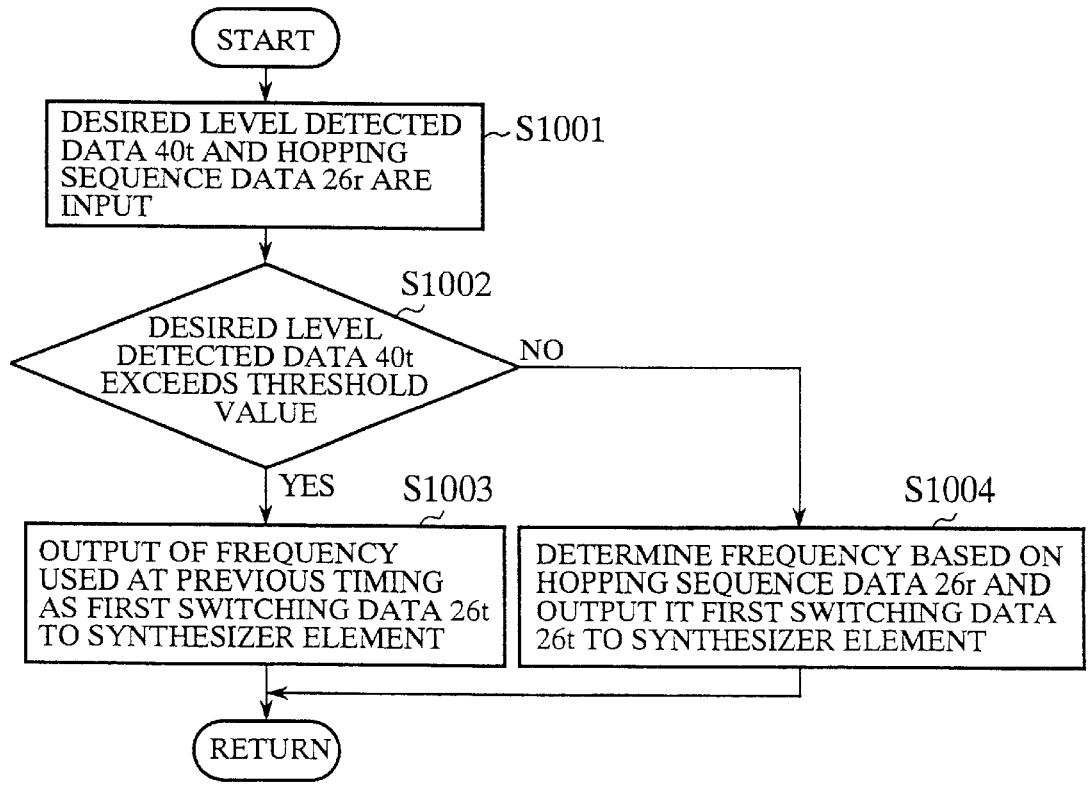
FIG. 4 is a flowchart for explaining the operation of the mobile station depicted in FIG. 3.

Turning next to FIG. 4, the operation of the control part 26 of the mobile station 10 in FIG. 3 will be described. FIG. 4 is a flowchart depicting the operation of the control part 26 of the mobile station 10 forming the mobile communication system according to Embodiment 1.

In step S1001 the control part 26 receives the level detected data 40t and the hopping sequence data 26r. Step S1001 is followed by step S1002.

In step S1002, based on the level detected data 40t input thereinto, the control part 26 makes a check to determine if the level of the received wave exceeds a predetermined threshold value. When the level of the received wave is above the predetermined threshold value, the procedure goes to step S1003. When the level of the received wave is below the predetermined threshold value, the procedure proceeds to step S1004.

In step S1003 the control part 26 determines that no frequency hopping is to be carried out, and supplies the synthesizer part 25 with the first switching data indicating the frequency being used at that time. The control part 26 terminates a sequence of processing steps with step S1003.

In step S1004 the control part 26 determines that frequency hopping be carried out, then determines the frequency to be switched by the frequency hopping based on the hopping sequence data 26r received from the send/receive data processing part 24, and supplies the synthesizer part 25 with the first switching data 26t indicating the thus determined frequency. The control part 16 terminates a sequence of processing steps with step S1004.

As described above, the mobile communication system of this embodiment determines whether or not to perform frequency hopping between the mobile station 10 and the base station 11, based on the received level of the received wave that is a signal of a frequency received by the mobile station 10 or the base station 11 from the latter or the former. When the receiving level of the received wave is low, frequency hopping is carried out, whereas when the receiving level is high, no frequency hopping takes place. Accordingly, frequency hopping is performed for the mobile station 10 of a low receiving level to switch the frequency being used therein to facilitate communications at a higher received level. For the mobile station 10 that already has a high receiving level. For the mobile station 10 that already has a high receiving level and hence has high transmission performance, no frequency hopping is carried out and the mobile station 10 continues high-quality, high-reliability communications with the base station 11.

The mobile communication system according to this embodiment permits reduction of the sending power of a signal that is sent from the mobile station 10 or the base station 11 when the receiving level of the received wave is high. Hence, it is possible to suppress interference between the above-mentioned send signal and a signal that is output from a mobile or base station in the neighboring repetition area which uses the same frequency as that in the above.

In the mobile communication system according to this embodiment, since frequency hopping is carried out for the mobile station 10 that is low in the receiving level of the received wave, a frequency diversity effect is produced, providing for enhanced received wave vs. same frequency interference power ratio. This allows ease in establishing communications at a higher receiving level, ensuring high-quality, high-reliability communications between the base and the mobile station.

Embodiment 2

Figure 5:
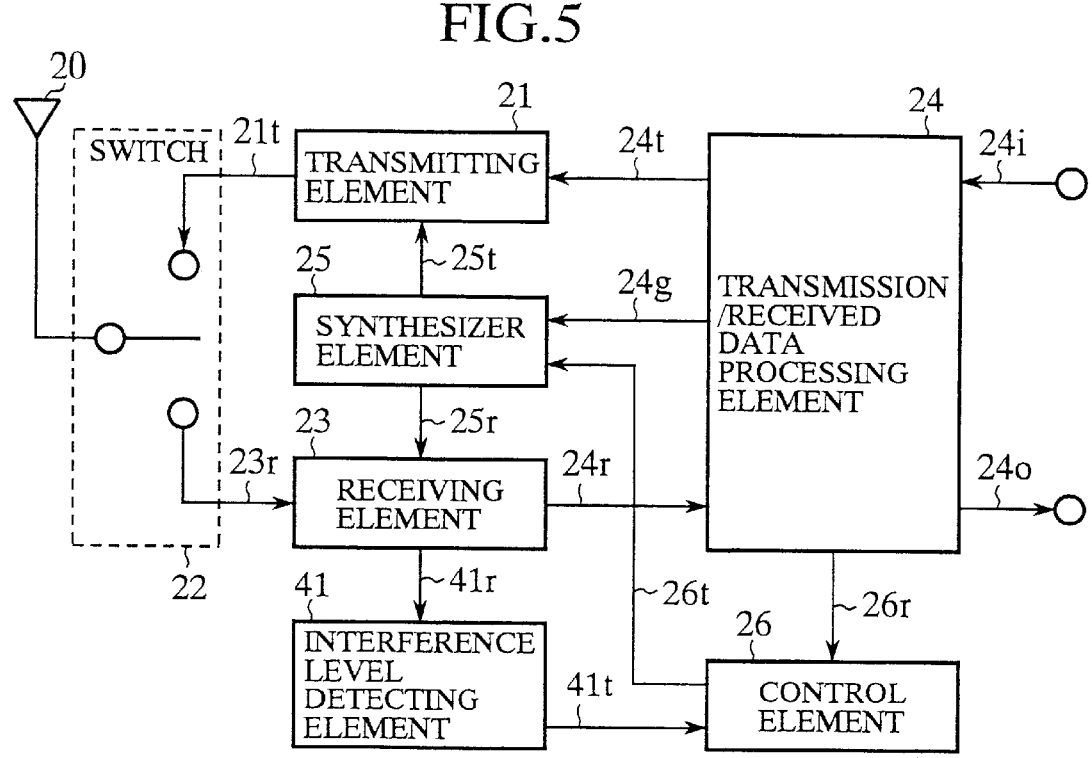
FIG. 5 is a block diagram illustrating a mobile station according to a second embodiment of the present invention.

A second embodiment (Embodiment 2) of the present invention will be described below with reference to FIG. 5. FIG. 5 illustrates in block form the mobile station 10 that forms the mobile communication system according to Embodiment 2. The mobile communication system of this embodiment observes the receiving level of an interference wave that is a received signal of a frequency different from that of the signal sent from the base station 11, and performs frequency hopping based on the result of observation.

In FIG. 5, reference numeral 41 denotes an interference wave level detecting part, which is connected to the receiving part 23 and the control part 26. Reference numeral 41r denotes interference wave level information, which is provided from the receiving part 23 to the interference wave level detecting part 41. Reference numeral 41t denotes interference wave level detected data, which is provided from the interference wave level detecting part 41 to the control part 26. The interference wave level detecting part 41 detects the interference wave receiving level based on the interference wave level information 41r input thereinto. Then, the interference wave level detecting part 42 supplies the control part 26 with the interference wave level detected data 41t based on the detected receiving level.

Next, a description will be given of the operation of the mobile station 10 that forms the mobile communication system depicted in FIG. 5.

In FIG. 5, the interference wave level information 41r is input into the interference wave level detecting part 41 via the antenna 20, the switch 22 and the receiving part 23. Based on the interference wave level information 41r input thereinto, the interference wave level detecting part 41 detects the receiving level of the interference wave received by the mobile station 10 or the base station 11. Then the interference wave level detecting part 41 provides to the control part 26 the interference wave level detected data 41r based on the input interference wave level information 41r.

Based on the interference wave level detected data 41t input thereinto, the control part 26 makes a check to determine if the detected interference wave level exceeds a predetermined threshold value. When the detected interference wave level does not exceed the predetermined threshold value, no frequency hopping takes place between the mobile station 10 and the base station 11. When the detected interference wave level exceeds the predetermined threshold value, frequency hopping is carried out between the mobile station 10 and the base station 11. When the frequency hopping is performed, the synthesizer part 25 switches, for example, the first frequency to the second one, based on the first switching data 26t provided from the control part 26.

The timing for the frequency switching by the synthesizer part 25 is determined by the timing signal 24g that is provided from the send/receive data processing part 24. The first switching data 26t that is provided from the control part 26 is determined using the hopping sequence data 26r also available from the send/receive data processing part 24. The frequency hopping between the mobile station 10 and the base station 11 may also be carried out through the combined use of the receiving level of the received wave and the interference wave receiving level.

That is, the frequency hopping takes place in the case where the receiving level of the received wave and the interference wave receiving level are both low, where the receiving level of the received wave is low but the interference wave receiving level is high, or where the receiving level of the received wave and the interference wave receiving level are both high. It is also considered that the frequency hopping is carried out when the interference wave receiving level is above the predetermined threshold value as well as when the former is equal to the latter. While in Embodiment 2 the mobile station performs the frequency switching after detecting the receiving level, the base station may also perform the detection of the interference wave receiving level and the frequency switching in this order. It is also possible that the mobile station detects the interference wave receiving level and indicates the detection result to the base station, causing it to perform the frequency switching. Alternatively, the base station may detect the interference wave receiving level first and then indicate the detection result to the mobile station, causing it to perform the frequency switching.

Figure 6:
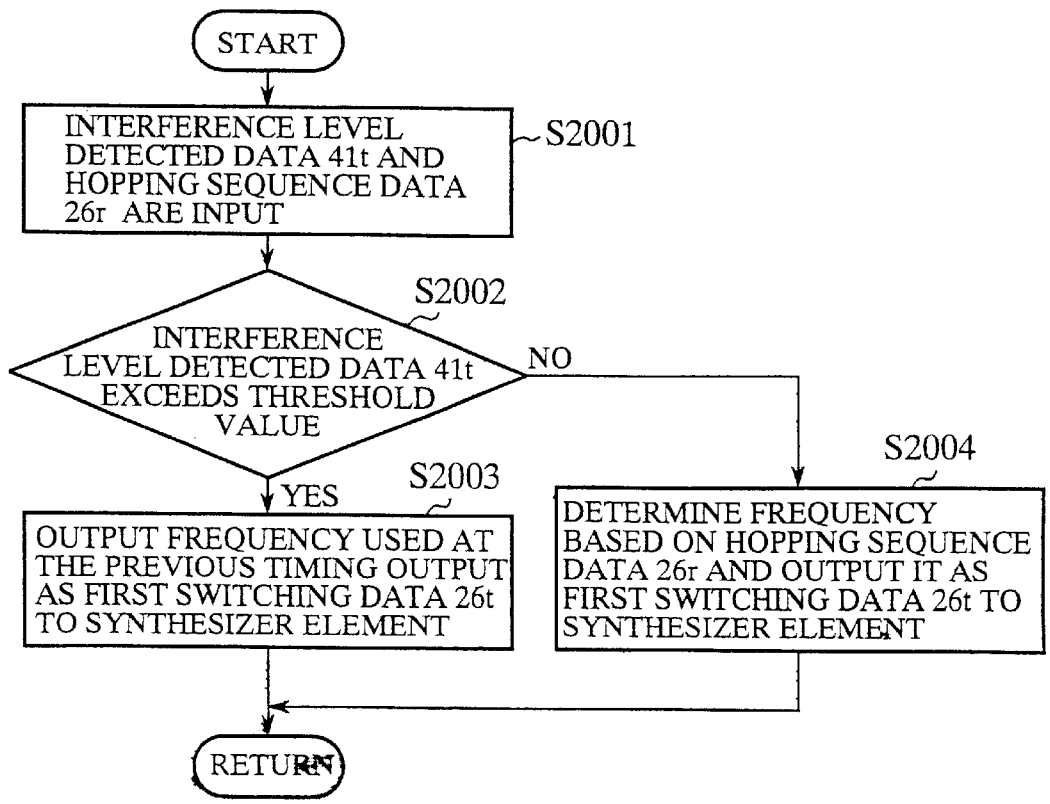
FIG. 6 is a flowchart for explaining the operation of the mobile station depicted in FIG. 5.

Turning next to FIG. 6, the operation of the control part 26 in the mobile communication system of Embodiment 2 depicted in FIG. 3 will be described. FIG. 6 is a flowchart depicting the operation of the control part 26 of the mobile station 10 forming the mobile communication system according to Embodiment 2.

In step S2001 the control part 26 receives the interference wave level detected data 41t and the hopping sequence data 26r. Step S2001 is followed by step S2002.

In step S2002, based on the interference wave level detected data 41t input thereinto, the control part 26 makes a check to determine if the level of the received wave exceeds a predetermined threshold value. When the interference wave level is below the predetermined threshold value, the procedure proceeds to step S2004. When interference wave level is above the predetermined threshold value, the procedure goes to step S2003.

In step S2003 the control part 26 determines that no frequency an enhanced received signal vs. same frequency interference power ratio, ensuring high-quality, high-reliability communications between the mobile station 10 and the base station 11.

With the mobile communication system according to this embodiment, even in the case of the mobile station having a receiving level of the received wave, frequency hopping is carried out based on the interference wave received level, switching the frequency at which the mobile station 10 and the base station 11 communicate with each other. This breaks up the influence of interference power by an arbitrary frequency and averages the interference power that each mobile station 10 suffers.

Embodiment 3

Figure 7:
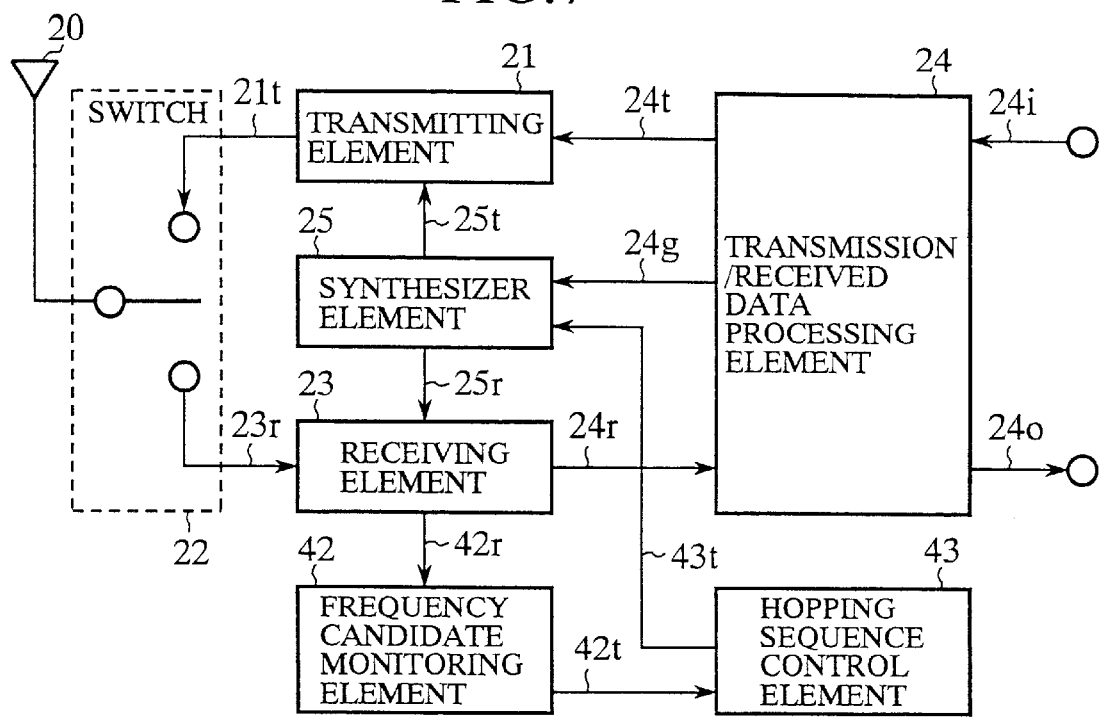
FIG. 7 is a block diagram illustrating a mobile station according to a third embodiment of the present invention.

Turning now to FIG. 7, another embodiment of the mobile station 10 in the mobile communication system according to the present invention will be described below. Embodiment 3 depicted in FIG. 7 is directed to a mobile communication system that generates a hopping sequence and performs frequency hopping based on the hopping sequence.

FIG. 7 illustrates in block form the mobile station 10 that has a hopping sequence according to Embodiment 3. In FIG. 7, reference numeral 42 denotes a frequency candidate monitoring part, which is connected to the receiving part 23 and a hopping sequence control part 43. The hopping sequence control part 43 is connected to the frequency candidate monitoring part 42 and the synthesizer part 25.

Reference numeral 42r denotes frequency candidate information, which is input into the frequency candidate information, which is input into the frequency candidate monitoring part 42 via the receiving part 23. The frequency candidate information 42r is information that is used to indicate one of given frequencies to each radio cell. Reference numeral 42t denotes hopping sequence candidate data, which is provided from the frequency candidate monitoring part 42 to the hopping sequence control part 43. The frequency candidate monitoring part 42 checks if the frequency based on the frequency candidate information 42r satisfies given requirements. Based on the result of this check, the frequency candidate monitoring part 42 outputs the hopping sequence candidate data 42t.

In step S2004 the control part 26 determines that the frequency hopping be carried out, then determines the frequency to be switched by the frequency hopping based on the hopping sequence data 26r received from the send/receive data processing part 24, and supplies the synthesizer part 25 with the first switching data 26t indicating the thus determined frequency. A sequence of operations by the control part 26 terminates with step S2004.

As described above, the mobile communication system of this embodiment determines whether or not to perform frequency hopping between the mobile station 10 and the base station 11, based on the receiving level of the interference wave that is a signal of a frequency different from that of a signal received by the mobile station 10 or the base station 11 from the latter or the former. When the interference wave receiving level low, frequency hopping is carried out, whereas when the interference wave receiving level is high, no frequency hopping takes place. Accordingly, frequency hopping is performed for the mobile station 10 of a high interference wave receiving level to switch the frequency being used therein to facilitate communications at a higher receiving level. for the mobile station 10 that is low in the receiving level of the received wave, frequency hopping is carried out to switch the frequency being used by the mobile station 10, enabling it to communicate with the base station 11 at a higher receiving level. For the mobile station 10 of a low interference wave receiving level, this system offers an excellent transmission quality with a low interference wave receiving level and radio cell. Reference numeral 42t denotes hopping sequence candidate data, which is provided from the frequency candidate monitoring part 42 to the hopping sequence control part 43. The frequency candidate monitoring part 42 makes a check to if the frequency based on the frequency candidate information 42r satisfies given requirements. Based on the result of this check, the frequency candidate monitoring part 12 outputs the hopping sequence candidate data 42t.

Reference numeral 43t denotes second switching data, which is provided from the hopping sequence control part 43 to the synthesizer part 25. Based on the second switching data 43t input thereinto, the synthesizer part 25 switches, for example, the first frequency to the second one. The second switching data 43t is output from the hopping sequence control part 43 based on the hopping sequence candidate data 42t input thereinto.

Next, a description will be given of a hopping sequence generating operation of the mobile station 10 in the mobile communication system of FIG. 7. The frequency candidate information 42r is input into the frequency candidate monitoring part 42 via the antenna 20, the switch 22 and the receiving part 23. Based on the frequency candidate information 42r input thereinto, the frequency candidate monitoring part 42 determines the frequency to be switched at the timing at which the frequency hopping is carried out next, and provides to the hopping sequence control part 43 the hopping sequence candidate data 42t indicative of the determined frequency.

Based on the hopping sequence candidate data 42t input thereinto, the hopping sequence control part 43 provides to the synthesizer part 25 the second switching data 43t that designates the same frequency as that specified by the hopping sequence candidate data 42t. Based on the second switching data 43t provided from the hopping sequence control part 43 and the timing signal 24g from the send/receive data processing part 24, the synthesizer part 25 provides to the transmitting part 21 the transmitting frequency data 25t for switching the frequency to be output therefrom, or provides the received frequency data 25r to the receiving part 23. The hopping sequence control part 43 sequentially records in a memory or similar recording part all pieces of the hopping sequence candidate data 42t input thereinto.

When a predetermined number of such hopping sequence candidate data 42t are recorded, the hopping sequence control part 43 independently generates a hopping sequence from the plurality of recorded pieces of hopping sequence candidate data 42t and holds the hopping sequence. The hopping sequence control part 43 uses its generated hopping sequence to determine the frequency to be switched at the timing of the next frequency hopping, and indicates the determined frequency to the synthesizer part 25 by sending thereto the second switching data 43t. The mobile communication system performs the frequency hopping based on the hopping sequence generated by the hopping sequence control part 43.

Figure 8:
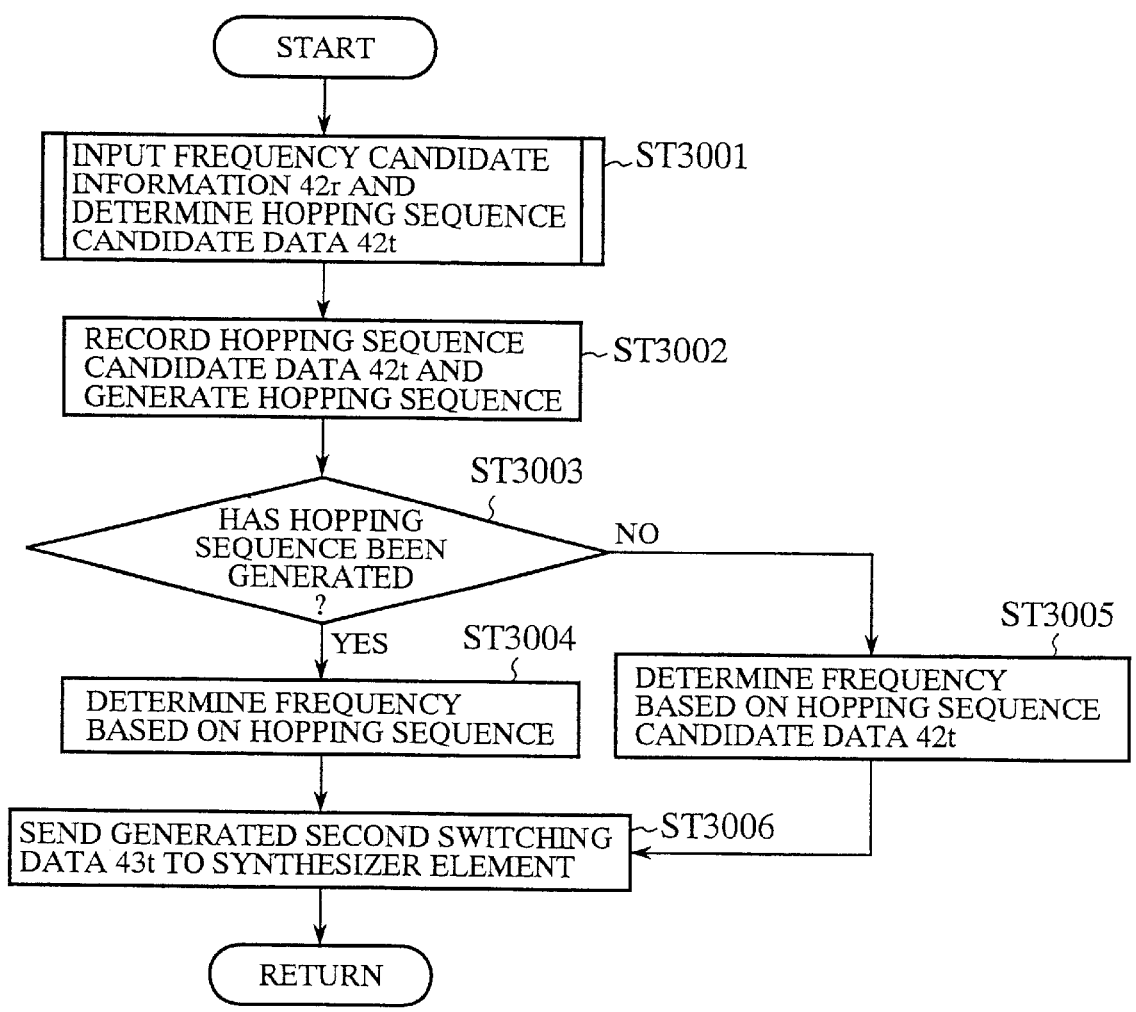
FIG. 8 is a flowchart for explaining the operations of a frequency candidate monitoring part and a hopping sequence control part of the mobile station depicted in FIG. 7.

Next, a description will be given, with reference to FIG. 8, of operations of the frequency candidate monitoring part 42 and the hopping sequence control part 43 of the mobile station 10 depicted in FIG. 7. FIG. 8 is a flowchart showing the operations of the frequency candidate monitoring part 42 and the hopping sequence control part 43 forming the mobile communication system according to Embodiment 3.

In step S3001 the frequency candidate monitoring part 42 receives the frequency candidate information 42r from the receiving part 23. The frequency candidate monitoring part 42 determines from the frequency candidate information 42r input thereinto the frequency to be switched at the timing of the next frequency hopping, and provides to the hopping sequence control part 43 the hopping sequence candidate data 42t indicative of the determined frequency. Step S3001 is followed by step S3002.

In step S3002 the hopping sequence control part 43 records the hopping sequence candidate data 42t input thereinto. When the number of recorded hopping sequence candidate data 42t reaches a predetermined value, the hopping sequence control part 43 generates a hopping sequence from the plurality of recorded hopping sequence candidate data 42t. Step S3002 is followed by step S3003.

In step S3003 the hopping sequence control part 43 makes a check to determine if a hopping sequence has been completely generated from the predetermined number of recorded hopping sequence candidate data 42t. If so, the procedure proceeds to step S3004, and if not, then the procedure goes to step S3005.

In step S3004 the hopping sequence control part 43 determines from its generated hopping sequence the frequency to be switched at the timing of the next frequency hopping. Step S3004 is followed by step S3006.

In step S3005 the hopping sequence control part 43 determines, from the hopping sequence candidate data 42t input thereinto, the frequency to be switched at the timing of the next frequency hopping. Step S3005 is followed by step S3006.

In step S3006 the hopping sequence control part 43 indicates its determined frequency to the synthesizer 24 by sending thereto the second switching data 43t. A sequence of operations ends with step S3006.

Figure 9:
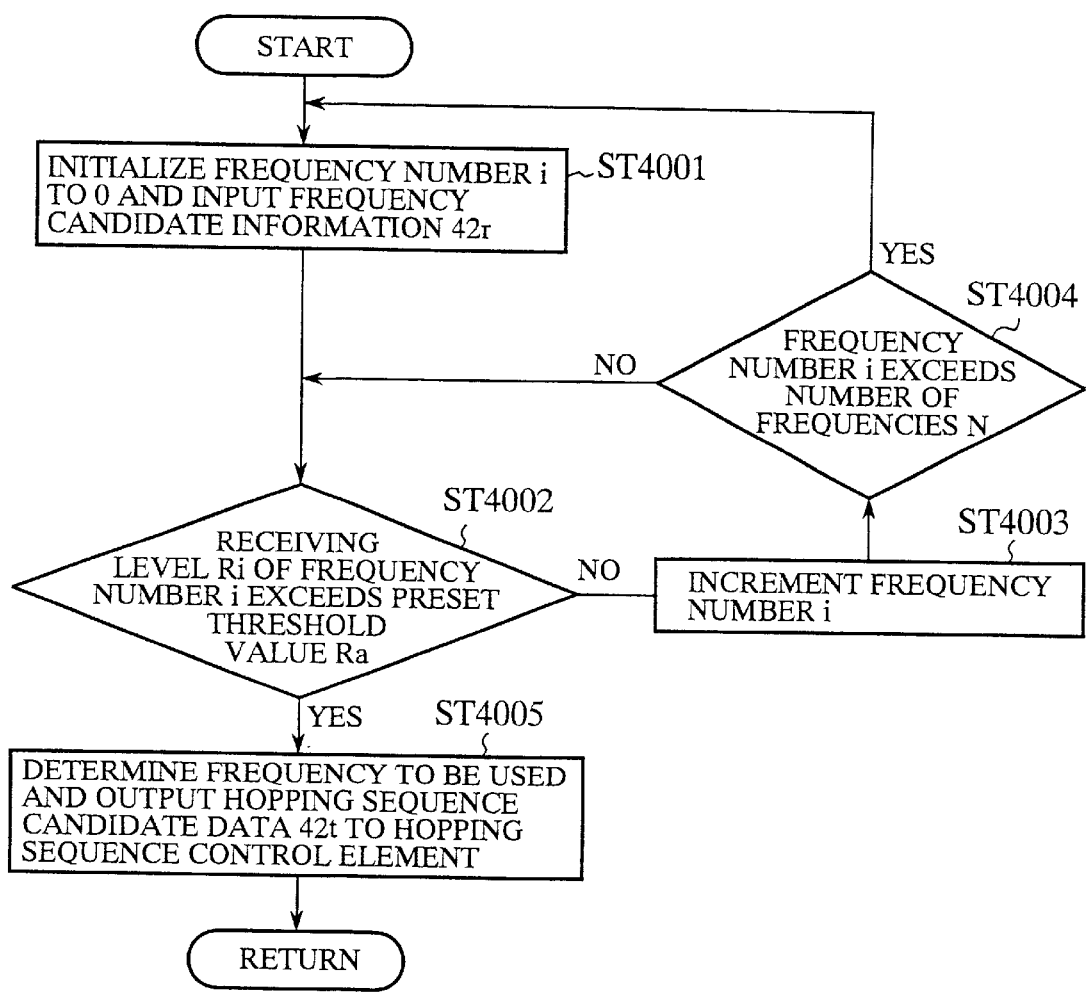
FIG. 9 is a diagram for explaining the operation of the frequency candidate monitoring part of the mobile station depicted in FIG. 7.

Referring next to FIG. 9, a detailed description will be given of the operation by which the frequency candidate monitoring part 42 determines the frequency to be switched by frequency hopping in step S3001. FIG. 9 is a flowchart for explaining the process in step S3001 in the FIG. 8 flowchart by which the frequency candidate monitoring part 42 determines the frequency to be switched by frequency hopping.

In step S4001 the frequency candidate monitoring part 42 observes or monitors the frequency candidate information 42r starting at a frequency number i (where i=0) so as to sequentially observe or monitor receiving levels concerning frequencies assigned predetermined frequency numbers. Step S4001 is followed by step S4002.

In step S4002 the frequency candidate monitoring part 42 detects the receiving level Ri of the frequency number i, and compares the detected receiving level Ri with a preset threshold value Ra of the receiving level. When the receiving level Ri exceeds the threshold value Ra, the procedure proceeds to step S4005. When the receiving level Ri falls short of the threshold value Ra, the procedure goes to step S4003. In step S4003 the frequency candidate monitoring part 42 increments the frequency number i. Step S4003 is followed by step S4004.

In step S4004 the frequency candidate monitoring part 42 makes a check to determine if the incremented frequency number i exceeds the frequency number N that is a given number of frequencies. When the frequency number i exceeds the frequency number N, the procedure returns to step S4001. When the frequency number i does not exceed the frequency number N, the procedure goes back to step S4002.

In step S4005 the frequency candidate monitoring part 42 determines the frequency that is switched at the timing of the next frequency hopping, and provides to the hopping sequence control part 43 the hopping sequence candidate data 42t indicative of the determined frequency. A series of operations by the frequency candidate monitoring part 42 ends with step S4005.

While in this embodiment the frequency to be switched by frequency hopping is determined based on the frequency receiving level, the frequency to be switched may also be determined using the interference wave receiving level instead of using the frequency receiving level. When the mobile station 10 or the base station 11 is high in the frequency receiving level or low in the interference wave receiving level, stable communications are established between the mobile station 11 and the base station 10.

As described above, the mobile communication system according to this embodiment uses, for frequency hopping, a hopping sequence generated through utilization of the hysteresis of each mobile station in the past. Hence, a mobile station of a high frequency of use in a predetermined coverage area need not perform frequency hopping based on a predetermined hopping sequence in which there are arranged frequencies whose receiving levels are not always high in the coverage area; but instead such a mobile station is allowed to perform frequency hopping based on its own hopping sequence in which there are arranged frequencies of high receiving levels in the coverage area. This provides relatively stable communications between the mobile station and the base station.

Embodiment 4

Figure 10:
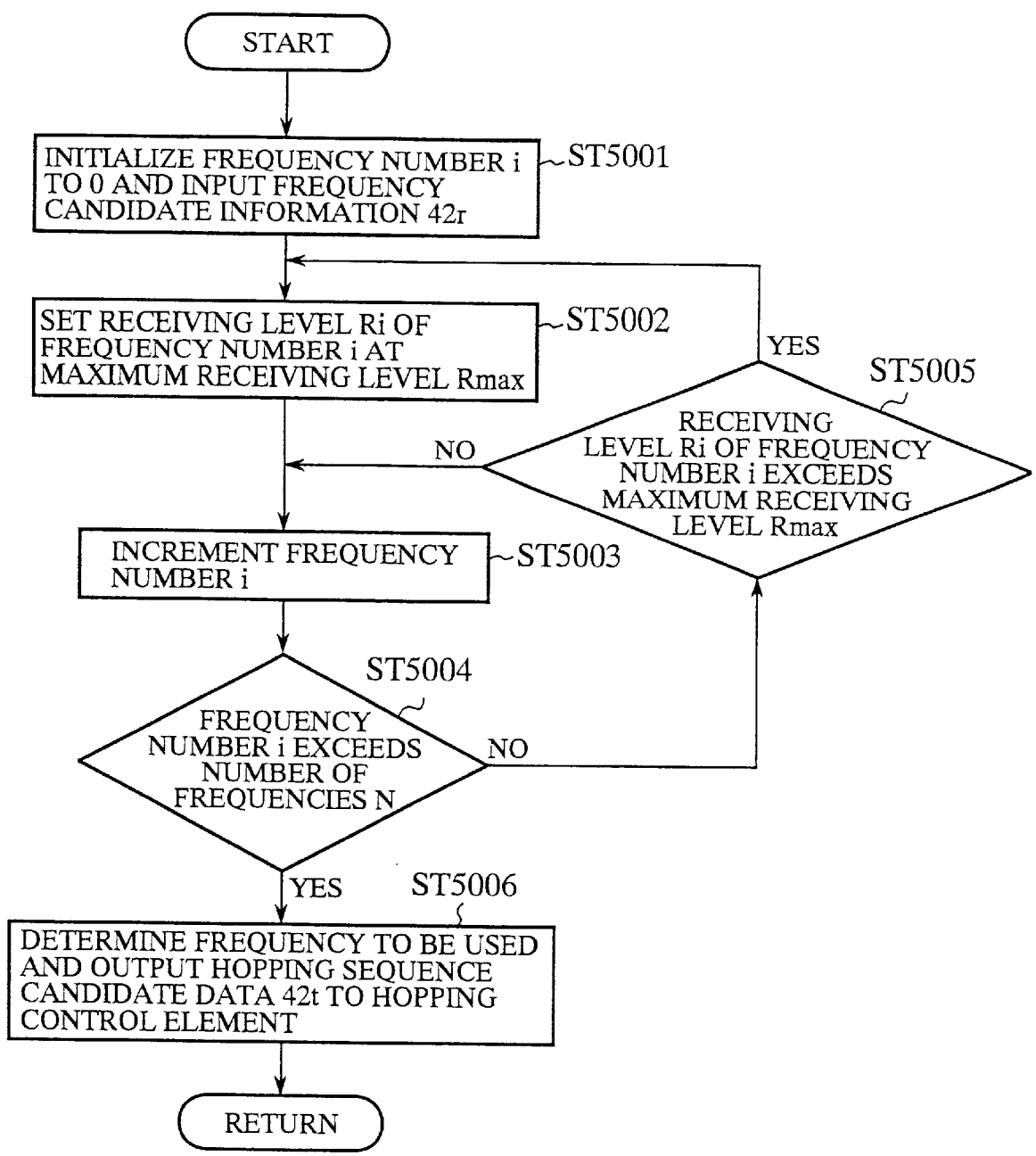
FIG. 10 is a diagram for explaining the operation of a frequency candidate monitoring part of a mobile station according to a fourth embodiment of the present invention.

Turning next to FIG. 10, another embodiment of the mobile station in the mobile communication system according to the present invention will be described below. FIG. 10 is a flowchart explaining the operation by which the frequency candidate monitoring part 42 determines the frequency to be switched by frequency hopping in a manner different from that described above in respect of step S3001 in the FIG. 8 flowchart. In other words, FIG. 8 is a flowchart for explaining the operation of the frequency candidate monitoring part 42 for determining the frequency to be switched by frequency hopping in step S3001 in the FIG. 8 flowchart.

In step S5001 in FIG. 10 the frequency candidate monitoring part 42 observes or monitors the frequency candidate information 42r starting at a frequency number i (where i=0) so as to sequentially observe or monitor receiving levels concerning frequencies assigned predetermined frequency numbers. Step S5001 is followed by step S5002.

In step S5002 the frequency candidate monitoring part 42 records, as the maximum receiving level Rmax, the receiving level Ri of a predetermined frequency assigned the frequency number i. Step S5002 is followed by step S5003.

In step S5003 the frequency candidate monitoring part 42 increments the frequency number i. Step S5003 is followed by step S5004.

In step S5004 the frequency candidate monitoring part 42 makes a check to determine if the incremented frequency number i exceeds the frequency number N. When the frequency number i exceeds the frequency number N, the procedure goes to step S5006. When the frequency number i does not exceed the frequency number N, the procedure goes to step S5005.

In step S5005 the frequency candidate monitoring part 42 compares the receiving level Ri concerning the predetermined frequency of the incremented frequency number i with the maximum receiving level Rmax recorded based on the results of comparison made so far. When the receiving level Ri exceeds the maximum receiving level Rmax, the procedure goes back to step S5002. When the receiving level Ri does not exceed the maximum receiving level Rmax, the procedure returns to step S5003.

In step S5006 the frequency candidate monitoring part 42 determines the frequency that is switched at the timing of the next frequency hopping, and provides to the hopping sequence control part 43 the hopping sequence candidate data 42t indicative of the determined frequency. A series of operations by the frequency candidate monitoring part 42 ends with step S5006.

While in this embodiment the frequency to be switched by frequency hopping is determined based on the frequency receiving level, the frequency to be switched may also be determined using the interference wave receiving level instead of using the frequency receiving level.

As described above, the mobile communication system according to this embodiment uses, for frequency hopping, a hopping sequence generated through utilization of the hysteresis of each mobile station in the past. Hence, a mobile station of a high frequency of use in a predetermined coverage area need not perform frequency hopping based on a predetermined hopping sequence in which there are arranged frequencies whose receiving levels are not always high in the coverage area; but instead such a mobile station is allowed to perform frequency hopping based on its own hopping sequence in which there are arranged frequencies of high receiving levels in the coverage area. This provides relatively stable communications between the mobile station and the base station.

Embodiment 5

Figure 11:
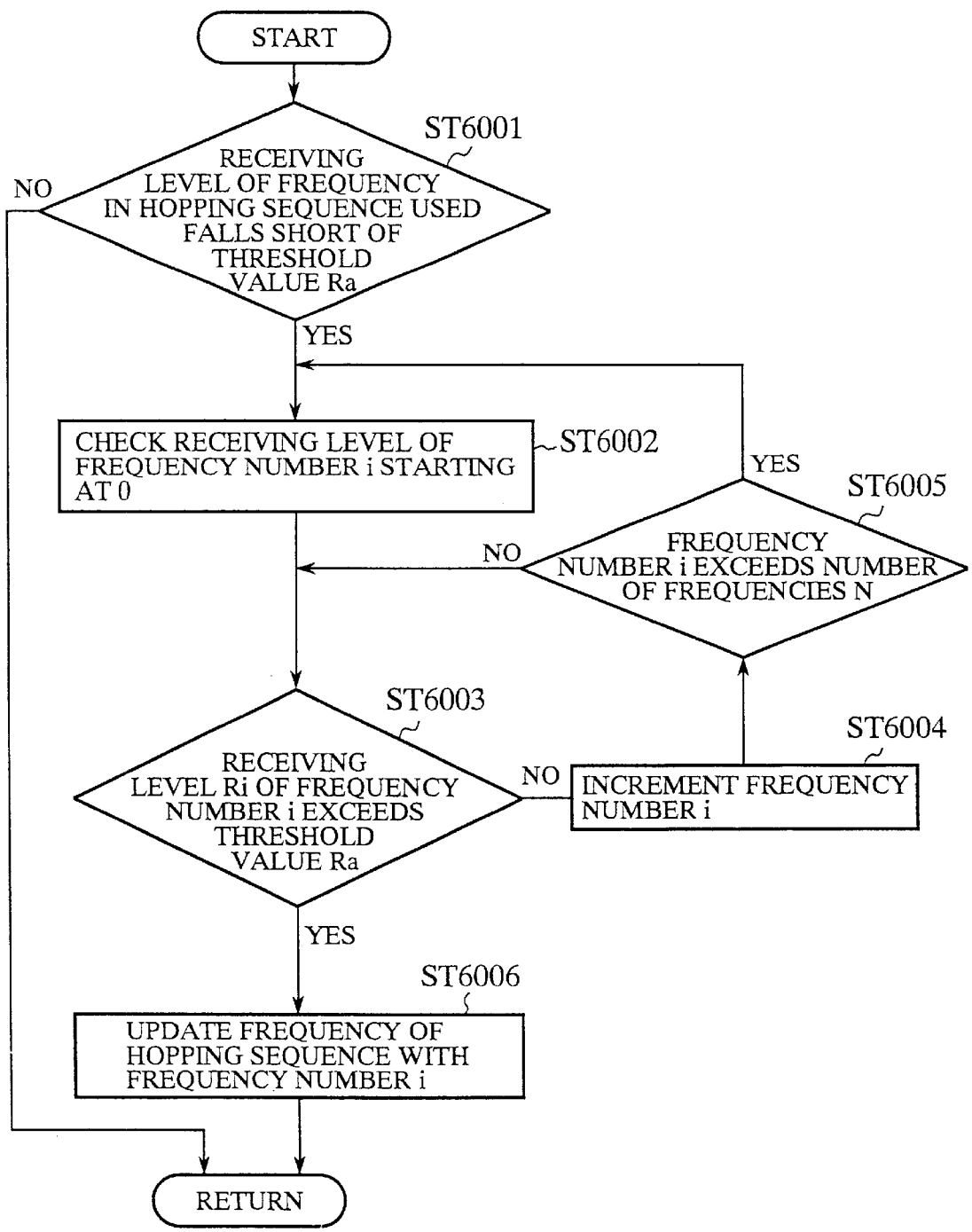
FIG. 11 is a flowchart for explaining the operation of a mobile station according to a fifth embodiment of the present invention.

With reference to FIG. 11, another embodiment of the mobile station 10 for the mobile communication system according to the present invention will be described below.

FIG. 11 is a flowchart for explaining an operation by which the hopping sequence generated by the method described above in respect of Embodiment 3 or 4 is updated with levels or interference levels that are detected when frequency hopping is carried out based on the hopping sequence. In other words, FIG. 11 is a flowchart explanatory of the hopping sequence updating process corresponding to step S3001 in the FIG. 8 flowchart.

In step S6001 in FIG. 11 the frequency candidate monitoring part 42 makes a check to see if the receiving level of a frequency concerned in the hopping sequence of the mobile station 10 falls short of the preset threshold value Ra. When the receiving level of the frequency is below the threshold value Ra, the procedure goes to step S6002. When the receiving level does not fall short of the threshold value Ra, the procedure ends.

In step S6002 the frequency candidate monitoring part 42 observes or monitors the frequency candidate information 42r starting at the frequency number i (where i=0) so as to sequentially observe or monitor the receiving levels concerning frequencies assigned predetermined frequency numbers. Upon completion of step S6002, the procedure goes to step S6003.

In step S6003 the frequency candidate monitoring part 42 makes a check to see if the receiving level Ri concerning a frequency of a certain frequency number i exceeds the preset threshold value Ra. When the receiving level Ri of that frequency exceeds the threshold value Ra, the procedure goes to step S6006. When the receiving level does not exceed the threshold value Ra, the procedure goes to step S6004.

In step S6004 the frequency candidate monitoring part 42 increments the frequency number i. Upon completion of step S6004, the procedure goes to step S6005.

In step S6005 the frequency candidate monitoring part 42 makes a check to determine if the incremented frequency number i exceeds the frequency number N. When the frequency number i exceeds the frequency number N, the procedure goes back to step S6002. When the frequency number i does not exceed the frequency N, the procedure returns to step S6003.

In step S6006 the frequency candidate monitoring part 42 provides to the hopping sequence control part 43 the hopping sequence candidate data 42t indicative of the frequency of the frequency number i concerned. Based on the hopping sequence candidate data input thereinto, the hopping sequence control part 43 updates data concerning the corresponding frequency in the hopping sequence that the mobile station 10 uses. A sequence of hopping sequence updating operations terminates with step S6006.

In the flowchart described above, the frequency in the hopping sequence at which the predetermined receiving level is not reached is switched to a frequency which satisfies the requirement. In this case, however, such a frequency at which the predetermined receiving level is not reached may be a frequency of the receiving level higher than any other observable frequencies. The frequency hopping is carried out based on the predetermined hopping sequence until the original hopping sequence is generated.

The original hopping sequence may be updated upon each elimination of an element forming the hopping sequence. In this instance, the predetermined hopping sequence is used from the time when one element of the original hopping sequence is removed therefrom to the time when the hopping sequence is updated with a new element. The original hopping sequence need not always he updated until a predetermined number of elements are eliminated therefrom. In this case, the hopping sequence with some elements removed therefrom is used intact until a predetermined number of elements are eliminated, and the predetermined hopping sequence is used from the time when the predetermined number of elements are eliminated to the time when the original hopping sequence is updated with a required number of new elements. It is possible to use different criteria for selecting arbitrary frequencies for forming the original hopping sequence and for eliminating therefrom arbitrary frequencies.

As described above, the mobile communication system according to this embodiment uses, for frequency hopping, a hopping sequence generated through utilization of the hysteresis of each mobile station in the past. Hence, a mobile station of a high frequency of use in a predetermined coverage area need not perform frequency hopping based on a predetermined hopping sequence in which there are arranged frequencies whose receiving levels are not always high in the coverage area; but instead such a mobile station is allowed to perform frequency hopping based on its own hopping sequence in which there are arranged frequencies of high receiving levels in the coverage area. This provides relatively stable communications between the mobile station and the base station.

Moreover, since the mobile communication system according to this embodiment uses, for frequency hopping, a hopping sequence generated through utilization of the hysteresis of each mobile station in the past, it is possible to obtain more actually usable channels than in the case of a fixed frequency assignment system in which predetermined hopping sequence is assigned to each frequency.

Further, according to the mobile communication system of this embodiment, the frequency in the original hopping sequence of this system at which the receiving level of the received wave is below the predetermined threshold value is replaced with that one of given frequencies at which the receiving level of the received wave exceeds the predetermined threshold value, by which the hopping sequence is updated. This ensures relatively stable, highly reliable communications between the mobile and the base station.

Additionally, according to the mobile communication system of this embodiment, the frequency in the original hopping sequence of this system at which the interference wave receiving level exceeds a predetermined threshold value is substituted for that one of given frequencies at which the interference wave receiving level falls short of the predetermined threshold value, by which the hopping sequence is updated. This ensures relatively stable, highly reliable communications between the mobile and the base station.

It is to be understood that the preferred embodiments of the present invention described above are construed as being merely illustrative of the invention and that many modifications and variations may be effected without departing from the spirit and scope of the claims appended hereunto.

What is claimed is:

1. A mobile communication system which comprises a base station and a mobile station that communicates with said base station while performing frequency hopping based on a predetermined hopping sequence, wherein based on the received power of a signal received from said base station at a first frequency in said hopping sequence, said mobile station switches from said first frequency to a second frequency next to said first frequency in said hopping sequence and communicates with said base station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

2. A mobile communication system according to claim 1, wherein when said received power of said signal received from said base station at said first frequency in said hopping sequence is above a predetermined power level, said mobile station communicates with said base station at said first frequency, and when said received power is below said predetermined power level, said mobile station switches from said first frequency to said second frequency in said hopping sequence and communicates with said base station at said second frequency.

3. A mobile communication system according to claim 1, wherein, based on the received power of an interference received with said received signal of said first frequency, said first frequency in said hopping sequence is selectively switched to said second frequency for further communication between said base station and said mobile station.

4. A mobile communication system according to claim 3, wherein said base station and said mobile station communicate with each other at said first frequency when said received power of said interference received with said received signal of said first frequency is below a predetermined power level, and when said received power of said interference is above said predetermined power level, said first frequency in said hopping sequence is switched to said second frequency so that said base station and said mobile station continue to communicate with each other at said second frequency.

5. A mobile communication system according to claim 1, wherein said mobile station or base station selectively eliminates from said original hopping sequence one of a plurality of frequencies in said hopping sequence at which received signal power does not satisfy a predetermined requirement.

6. A mobile communication system according to claim 1, wherein said mobile station or base station detects the received power of a received signal at every frequency in said hopping sequence for each cycle during which said mobile station or base station performs frequency hopping to all the frequencies in said hopping sequence, then records in a recording part one of said frequencies at which the received power is maximum, and creates said original hopping sequence based on a plurality of frequencies recorded in said recording part.

7. A mobile communication system according to claim 6, wherein said mobile station or base station eliminates from said original hopping sequence one of a plurality of frequencies in said hopping sequence at which said received power of said received signal does not satisfy a predetermined requirement.

8. A mobile communication system according to claim 1, wherein said performance criterion relates to power level of a signal received on the candidate frequency.

9. A mobile communication system according to claim 1, wherein said mobile station or said base station iteratively selects the candidate frequency associated with a maximum power level of a received signal.

10. A mobile communication system according to claim 1, wherein said mobile station or said base station modifies said original hopping sequence by selectively eliminating frequencies that said mobile station or said base station determines to be inadequate.

11. A mobile communication system according to claim 10, wherein said mobile station or said base station eliminates a frequency from said original hopping sequence when a power level of a signal received on the frequency or an interference level on the frequency does not satisfy a threshold value.

12. A mobile communication system which comprises a base station and a mobile station that communicates with said base station while performing frequency hopping based on a predetermined hopping sequence, wherein said mobile station outputs information based on the received power of a signal received from said base station at a first frequency in said hopping sequence and, based on said information, said base station switches from said first frequency to a second frequency next to said first frequency in said hopping sequence and communicates with said mobile station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

13. A mobile communication system which comprises a mobile station and a base station that communicates with said mobile station while performing frequency hopping based on a predetermined hopping sequence, wherein based on the received power of a signal received from said mobile station at a first frequency in said hopping sequence, said base station switches from said first frequency to a second frequency next to said first frequency in said hopping sequence and communicates with said mobile station at said second frequency, and wherein said mobile station or said base station creates an original hopping sequence for communication between said mobile station and said base station by iteratively monitoring a plurality of candidate frequencies and selecting frequencies to be included in the original hopping sequence that satisfy at least one performance criterion.

14. A mobile communication system according to claim 13, wherein when said received power of said signal received from said mobile station at said first frequency in said hopping sequence is above a predetermined power level, said base station communicates with said mobile station at said first frequency, and when said received power is below said predetermined power level, said base station switches from said first frequency to said second frequency in said hopping sequence and communicates with said mobile station at said second frequency.

15. A mobile communication system according to claim 13, wherein, based on the received power of an interference received with said received signal of said first frequency, said first frequency in said hopping sequence is switched to a second frequency next to said first frequency for further communication between said base station and said mobile station.

16. A mobile communication system according to claim 15, wherein said base station and said mobile station communicate with each other at said first frequency when said received power of said interference received with said received signal of said first frequency is below a predetermined power level, and when said received power of said interference is above said predetermined power level, said first frequency in said hopping sequence is switched to said second frequency so that said base station and said mobile station continue to communicate with each other at said second frequency.

17. A mobile communication system according to claim 13, wherein said mobile or base station eliminates from said original hopping sequence one of a plurality of frequencies in said hopping sequence at which received signal power does not satisfy a predetermined requirement.

18. A mobile communication system according to claim 10, wherein said mobile station or base station detects the received power of a received signal at every frequency in said hopping sequence for each cycle during which said mobile station or base station performs frequency hopping to all the frequencies in said hopping sequence, then records in a recording part one of said frequencies at which the received power is maximum, and creates said original hopping sequence based on plural frequencies recorded in said recording part.

19. A mobile communication system according to claim 16, wherein said mobile station or base station eliminates from said original hopping sequence one of a plurality of frequencies in said hopping sequence at which said received power of said received signal does not satisfy a predetermined requirement.

20. A mobile communication system according to claim 13, wherein said performance criterion relates to power level of a signal received on the candidate frequency.

21. A mobile communication system according to claim 20, wherein said mobile station or said base station iteratively selects the candidate frequency associated with a maximum power level of a received signal.

22. A mobile communication system according to claim 13, wherein said mobile station or said base station modifies said original hopping sequence by selectively eliminating frequencies that said mobile station or said base station determines to be inadequate.

23. A mobile communication system according to claim 22, wherein said mobile station or said base station eliminates a frequency from said original hopping sequence when a power level of a signal received on the frequency or an interference level for the frequency does not satisfy a threshold value.

24. A mobile communication system which comprises a mobile station and a base station that communicates with said mobile station while performing frequency hopping based on a predetermined hopping sequence, wherein said base station outputs information based on the received power of a signal received from said mobile station at a first frequency in said hopping sequence and, based on said information, said mobile station switches said first frequency to a second frequency next to said first frequency in said hopping sequence and communicates with said base station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

25. A mobile communication system which comprises a base station and a mobile station that communicates with said base station while performing frequency hopping based on a predetermined hopping sequence, wherein based on the received power of an interference received with a received signal from said base station at a first frequency in said hopping sequence, said mobile station switches from said first frequency to a second frequency next to said first frequency in said hopping sequence and communicates with said base station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

26. A mobile communication system according to claim 25, wherein when said received power of said interference received with said receive signal from said base station at said first frequency in said hopping sequence is below a predetermined power level, said mobile station communicates with said base station at said first frequency, and when said received power of said interference is above said predetermined power level, said mobile station switches from said first frequency to said second frequency in said hopping sequence and communicates with said base station at said second frequency.

27. A mobile communication system according to claim 25 wherein said mobile station or base station eliminates from said original hopping sequence one of a plurality of frequencies in said hopping sequence at which said received power of said interference does not satisfy a predetermined requirement.

28. A mobile communication system according to claim 25, wherein said mobile station or base station detects the received power of interference at every frequency in said hopping sequence for each cycle during which said mobile station or base station performs frequency hopping to all the frequencies in said hopping sequence, then records in a recording part one of said frequencies at which the received power is maximum, and creates said original hopping sequence based on a plurality of frequencies recorded in said recording part.

29. A mobile communication system according to claim 28, wherein said mobile station or base station eliminates from said original hopping sequence one of a plurality of frequencies in said hopping sequence at which said received power of said interference does not satisfy a predetermined requirement.

30. A mobile communication system according to claim 25, wherein said performance criterion relates to power level of a signal received on the candidate frequency.

31. A mobile communication system according to claim 30, wherein said mobile station or said base station iteratively selects the candidate frequency associated with a maximum power level of a received signal.

32. A mobile communication system according to claim 25, wherein said mobile station or said base station modifies said original hopping sequence by selectively eliminating frequencies that said mobile station or said base station determines to be inadequate.

33. A mobile communication system according to claim 32, wherein said mobile station or said base station eliminates a frequency from said original hopping sequence when a power level of a signal received on the frequency or an interference level for the frequency does not satisfy a threshold value.

34. A mobile communication system which comprises a base station and a mobile station that communicates with said base station while performing frequency hopping based on a predetermined hopping sequence, wherein said mobile station outputs information based on the received power of an interference received with a signal received from said base station at a first frequency in said hopping sequence and, based on said information, said base station switches from said first frequency to a second frequency next to said first frequency in said hopping sequence and communicates with said mobile station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

35. A mobile communication system which comprises a mobile station and a base station that communicates with said mobile station while performing frequency hopping based on a predetermined hopping sequence, wherein based on the received power of an interference received with a received signal from said mobile station at a first frequency in said hopping sequence, said base station switches from said first frequency to a second frequency next to said first frequency in said hopping sequence and communicates with said mobile station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

36. A mobile communication system according to claim 35, wherein when said received power of said interference received with said received signal from said mobile station at said first frequency in said hopping sequence is below a predetermined power level, said base station communicates with said mobile station at said first frequency, and when said received power of said interference is above said predetermined power level, said base station switches from said first frequency to said second frequency in said hopping sequence and communicates with said mobile station at said second frequency.

37. A mobile communication system according to claim 35, wherein said mobile station or base station eliminates from said original hopping sequence one of a plurality of frequencies in said hopping sequence at which said received power of said interference does not satisfy a predetermined requirement.

38. A mobile communication system according to claim 35, wherein said mobile station or base station detects the received power of interference at every frequency in said hopping sequence for each cycle during which said mobile station or base station performs frequency hopping to all the frequencies in said hopping sequence, then records in a recording part one of said frequencies at which the received power is maximum, and creates said original hopping sequence based on a plurality of frequencies recorded in said recording part.

39. A mobile communication system according to claim 38, wherein said mobile station or base station eliminates from said original hopping sequence one of a plurality of frequencies in said hopping sequence at which said received power of said interference does not satisfy a predetermined requirement.

40. A mobile communication system according to claim 35, wherein said performance criterion relates to power level of a signal received on the candidate frequency.

41. A mobile communication system according to claim 40, wherein said mobile station or said base station itera- tively selects the candidate frequency associated with a maximum power level of a received signal.

42. A mobile communication system according to claim 35, wherein said mobile station or said base station modifies said original hopping sequence by selectively eliminating frequencies that said mobile station or said base station determines to be inadequate.

43. A mobile communication system according to claim 42, wherein said mobile station or said base station elimi- nates a frequency from said original hopping sequence when a power level of a signal received on the frequency or an interference level on the frequency does not satisfy a thresh- old value.

44. A mobile communication system which comprises a mobile station and a base station that communicates with said mobile station while performing frequency hopping based on a predetermined hopping sequence, wherein said base station outputs information based on the received power of an interference received with a signal received from said mobile station at a first frequency in said hopping sequence and, based on said information, said mobile station switches from said first frequency to a second frequency next to said first frequency in said hopping sequence and communicates with said base station at said second frequency, and said mobile station or said base station creates an original hopping sequence for communication between said mobile station and said base station by iteratively monitoring a plurality of candidate frequencies and selecting frequencies to be included in the original hopping sequence that satisfy at least one performance criterion.

45. A mobile communication system which comprises a base station, a first mobile station that communicates with said base station while performing frequency hopping based on a first hopping sequence, and a second mobile station that communicates with said base station while performing fre- quency hopping based on a second hopping sequence, wherein when said first mobile station, which communicates with said base station at a first frequency in said first hopping sequence, continues to communicate with said base station at said first frequency based on the received power of a signal received from said base station at said first frequency, said second mobile station communi- cates with said base station while performing frequency hopping based on said second hopping sequence com- posed of a plurality of frequencies except said first frequency, and said first mobile station or said base station creates an original hopping sequence for communication between said first mobile station and said base station by itera- tively monitoring a plurality of candidate frequencies and selecting frequencies to be included in the original hopping sequence that satisfy at least one performance criterion.

46. A mobile communication system according to claim 45, wherein said first mobile station communicates with said base station at said first frequency in said first hopping sequence, and when said received power of said signal received from said base station at said first frequency is above a predetermined power level, said first mobile station continues to communicate with said base station at said first frequency.

47. A mobile communication system according to claim 33, wherein said first mobile station communicates with said base station at said first frequency in said first hopping sequence and when said received power of said signal received from said base station at said first frequency is above a predetermined power level, said first mobile station continues to communicate with said base station at said first frequency, and wherein said second mobile station communicates with said base station at a second frequency in said second hopping sequence and when the received power of a signal received from said base station at said second frequency is below a predetermined power level, said second mobile station communicates with said base station while performing frequency hopping based on said second hopping sequence composed of a plurality of frequencies except said first frequency.

* * * * *